United States Patent
Lee et al.

(10) Patent No.: US 8,514,737 B2
(45) Date of Patent: Aug. 20, 2013

(54) METHOD FOR ESTIMATING CARRIER-TO-NOISE RATIO AND BASE STATION APPARATUS USING THE SAME IN A WIRELESS ACCESS SYSTEM

(75) Inventors: Hyon-Seung Lee, Seoul (KR); Byoung-Ha Yi, Seoul (KR); Ki-Young Han, Yongin-si (KR); Chung-Ryul Chang, Yongin-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 411 days.

(21) Appl. No.: 13/004,318

(22) Filed: Jan. 11, 2011

(65) Prior Publication Data

US 2011/0170442 A1    Jul. 14, 2011

(30) Foreign Application Priority Data

Jan. 12, 2010  (KR) .................. 10-2010-0002839

(51) Int. Cl.
*H04L 12/26*    (2006.01)
*H04B 3/46*    (2006.01)

(52) U.S. Cl.
USPC .................. 370/252; 375/227; 455/226.3

(58) Field of Classification Search
USPC .................. 370/252; 375/227; 455/226.3
See application file for complete search history.

(56) References Cited

U.S. PATENT DOCUMENTS

| | | | |
|---|---|---|---|
| 7,844,007 B2 * | 11/2010 | Murali et al. ................. | 375/260 |
| 7,860,047 B2 * | 12/2010 | Urushihara et al. .......... | 370/328 |
| 8,018,991 B2 * | 9/2011 | Yi et al. ........................ | 375/227 |
| 8,351,411 B2 * | 1/2013 | Kim et al. ..................... | 370/342 |

OTHER PUBLICATIONS

Digital Transmission: Carrier-to-Noise Ratio, Signal-to-Noise Ratio, and Modulation Error Ratio. 2006 Broadcom Corporation and Cisco Systems. pp. 2-41.*

* cited by examiner

*Primary Examiner* — Hassan Kizou
*Assistant Examiner* — Emmanuel Maglo
(74) *Attorney, Agent, or Firm* — Jefferson IP Law, LLP

(57) ABSTRACT

A method and an apparatus for estimating a Carrier-to-Noise Ratio (CNR) at a Base Station (BS) in a wireless access system are provided. In the method, a preamble signal received from at least one neighbor BS is converted to a frequency response of a preamble sequence and Inverse Fast Fourier Transform (IFFT)-processing the preamble signal, an estimation period of the IFFT-processed preamble signal, corresponding to a Fast Fourier Transform (FFT) size, is divided into a predetermined number of blocks, carrier power values of the blocks are accumulated for a predetermined number of frames, an average of timing offsets of the frames corresponding to a position of a block having a maximum average of accumulated carrier values is determined to be a timing offset of the preamble signal, a carrier power value of the preamble signal is calculated using the timing offset, and a CNR of the preamble signal is estimated using the carrier power value.

16 Claims, 11 Drawing Sheets

METHOD FOR ESTIMATING CARRIER-TO-NOISE RATIO AND BASE STATION APPARATUS USING THE SAME IN A WIRELESS ACCESS SYSTEM

PRIORITY

This application claims the benefit under 35 U.S.C. §119 (a) of a Korean patent application filed in the Korean Intellectual Property Office on Jan. 12, 2010 and assigned Serial No. 10-2010-0002839, the entire disclosure of which is hereby incorporated by reference.

BACKGROUND OF THE INVENTION

1. Field of the Invention

The present invention relates generally to a method and apparatus for estimating a carrier-to-noise ratio in a wireless access system. More particularly, the present invention relates to a method and apparatus for estimating a carrier-to-noise ratio using a preamble signal in an environment where the service coverage of a Base Station (BS) is extended.

2. Description of the Related Art

The Institute of Electrical and Electronics Engineers (IEEE) 802.16 standard defines a wireless access system that enables high-speed data transmission with mobility. According to a Self Organized Network (SON) technology, wireless environment information is acquired by estimating the Carrier-to-Noise Ratios/Carrier-to-Interference and Noise Ratios (CNRs/CINRs) of neighbor BSs and optimum operation parameters, such as transmission power control, Frequency Allocation (FA) selection, etc., are updated autonomously based on the CNRs/CINRs of the neighbor BSs.

A BS estimates a timing offset using a preamble and then estimates a CNR/CINR using the timing offset.

The structure of a preamble signal for CNR/CINR estimation will be described. The first Orthogonal Frequency Division Multiplexing (OFDM) symbol of a frame is allocated to a preamble. A preamble sequence is allocated to every third subcarrier in the OFDM symbol.

FIGS. 1A, 1B and 1C illustrate methods for allocating a preamble signal in a wireless access system according to the related art.

Three methods for allocating a preamble sequence may be defined according to the positions of subcarriers allocated to the preamble sequence. FIGS. 1A, 1B and 1C illustrate these three methods which are referred to as segment 0, segment 1, and segment 2, respectively. That is, a segment refers to a method for allocating subcarriers to a preamble signal. A preamble sequence is repeated at every third tone in each segment. For example, a preamble sequence is repeated at tones 0, 3, 6, . . . in segment 0 (FIG. 1A), at tones 1, 4, 7, . . . in segment 1 (FIG. 1B), and at tones 2, 5, 8, . . . in segment 2 (FIG. 1C). In segment 0, tone 426 is not allocated.

FIG. 2 illustrates a method for estimating a timing offset by Inverse Fast Fourier Transform (IFFT)-processing the frequency response of a preamble sequence according to the related art.

When a preamble sequence having a Preamble Index (PI) is IFFT-processed, the components of the preamble sequence are delayed by a specific number of samples according to the arrival time of the preamble sequence in the time domain. In FIG. 2, a Fast Fourier Transform (FFT) size is 1024, by way of example. Because the preamble sequence is repeated at every third tone, the components of the IFFT signal is repeated every 341 samples.

In general, a pico cell BS estimates a timing offset only for a signal having fewer than 341 samples except for a signal repetition period, using a search window 200 of a size smaller than the repetition period (i.e., 341). The estimated timing offset indicates the start position of FFT samples and is used to estimate a carrier power and the Received Signal Strength Indication (RSSI) power and noise power of each segment through FFT. Especially, the estimated timing offset is used to estimate the CNR/CINR of the preamble index.

$$CNR_{PI} = \frac{RxR_{PI}}{NP} \quad (1)$$

$$CINR_{PI} = \frac{RxR_{PI}}{I_{PIseg} + NP} \quad (2)$$

where $RxR_{PI}$ denotes the carrier power of the preamble, $I_{PIseg}$ denotes interference except for the segment RSSI power of the preamble index in the RSSI power of a segment having the preamble index, and NP denotes a noise power.

A BS using the SON-based self-configuration technology should measure signals from neighbor BSs to acquire information about the wireless channel environment of the neighbor BSs in the IEEE 802.16 system. Thus, the BS can optimize operation parameters based on the acquired information.

The signals from the neighbor BSs are delayed according to the distances to the neighbor BSs or the adjacent wireless channel environment. Therefore, the BS corrects a timing offset to synchronize with the delayed signals by estimating the timing offset using a preamble signal.

As illustrated in FIG. 2, in view of the characteristic of a preamble sequence being repeated every three tones, the IFFT signal of the preamble sequence is repeated every 341 samples in the time domain. Therefore, if the search window size is increased to a sample period being a third of the FFT size (i.e., 341 or more samples) as indicated by reference numeral 202, an actual preamble signal is not distinguished from its repetition when a peak component of the preamble signal is located. As a result, the use of a search window having as many samples as a third of an FFT size leads to the degradation of estimation performance.

However, because the IEEE 802.16 system using the SON technology needs to increase a search window size to or above a third of an FFT size due to various requirements of service coverage and transmission power, there is a need to provide an improved method and apparatus for estimating information about an adjacent wireless environment using a CNR in a wireless access system.

SUMMARY OF THE INVENTION

An aspect of the present invention is to address at least the above-mentioned problems and/or disadvantages and to provide at least the advantages described below. Accordingly, an aspect of the present invention is to provide a method and apparatus for estimating information about an adjacent wireless environment using a Carrier-to-Noise Ratio (CNR) in a wireless access system.

Another aspect of the present invention is to provide a method and apparatus for estimating a timing offset without ambiguity in spite of as long a signal delay as a specific number of samples or more samples and estimating a CNR using the timing offset.

A further aspect of the present invention is to provide a method and apparatus for estimating a CNR without degrading estimation performance even though a search window size equals or exceeds a specific number of samples.

In accordance with an aspect of the present invention, a method for estimating a CNR at a Base Station (BS) in a wireless access system is provided. The method includes converting a preamble signal received from at least one neighbor BS to a frequency response of a preamble sequence and Inverse Fast Fourier Transform (IFFT)-processing the preamble signal, dividing an estimation period of the IFFT-processed preamble signal, corresponding to a Fast Fourier Transform (FFT) size, into a predetermined number of blocks, accumulating carrier power values of the blocks for a predetermined number of frames, calculating average carrier power values and determining an average of timing offsets of the frames corresponding to a position of a block having a maximum average carrier value as a timing offset of the preamble signal, calculating a carrier power value of the preamble signal using the timing offset, and estimating a CNR of the preamble signal using the carrier power value.

In accordance with another aspect of the present invention, a BS apparatus for estimating a CNR in a wireless access system is provided. The apparatus includes a receiver for converting a preamble signal received from at least one neighbor BS to a frequency response of a preamble sequence and for IFFT-processing the preamble signal, and a CNR estimator for dividing an estimation period of the IFFT-processed preamble signal, corresponding to an FFT size, into a predetermined number of blocks, for accumulating carrier power values of the blocks for a predetermined number of frames and determining an average of timing offsets of the frames corresponding to a position of a block having a maximum average of accumulated carrier values to be a timing offset of the preamble signal, for calculating a carrier power value of the preamble signal using the timing offset, and for estimating a CNR of the preamble signal using the carrier power value.

Other aspects, advantages, and salient features of the invention will become apparent to those skilled in the art from the following detailed description, which, taken in conjunction with the annexed drawings, discloses exemplary embodiments of the invention.

BRIEF DESCRIPTION OF THE DRAWINGS

The above and other aspects, features and advantages of certain exemplary embodiments of the present invention will be more apparent from the following description taken in conjunction with the accompanying drawings, in which.

Throughout the drawings, the same drawing reference numerals will be understood to refer to the same elements, features and structures.

DETAILED DESCRIPTION OF EXEMPLARY EMBODIMENTS

The following description with reference to the accompanying drawings is provided to assist in a comprehensive understanding of exemplary embodiments of the invention as defined by the claims and their equivalents. It includes various specific details to assist in that understanding but these are to be regarded as merely exemplary. Accordingly, those of ordinary skill in the art will recognize that various changes and modifications of the embodiments described herein can be made without departing from the scope and spirit of the invention. In addition, descriptions of well-known functions and constructions may be omitted for clarity and conciseness.

The terms and words used in the following description and claims are not limited to the bibliographical meanings, but, are merely used by the inventor to enable a clear and consistent understanding of the invention. Accordingly, it should be apparent to those skilled in the art that the following description of exemplary embodiments of the present invention is provided for illustration purpose only and not for the purpose of limiting the invention as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

A description will be given of a method for estimating the Carrier-to-Noise Ratio/Carrier-to-Interference and Noise Ratio (CNR/CINR) of a transmission signal using a preamble synchronization scheme for an extended coverage of a Base Station (BS) to which the Self Organized Network (SON) technology is applied in a wireless access system.

Figure 1A:
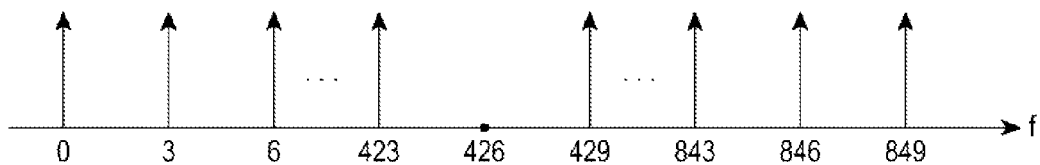
FIGS. 1A, 1B and 1C illustrate methods for allocating a preamble signal in a wireless access system according to the related art.
Figure 1B:
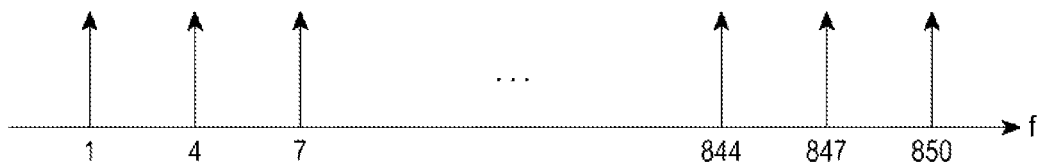
Figure 1C:
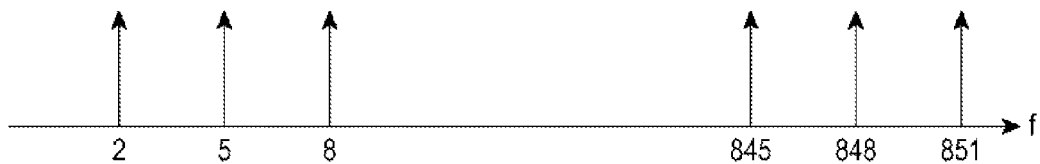
Figure 2:
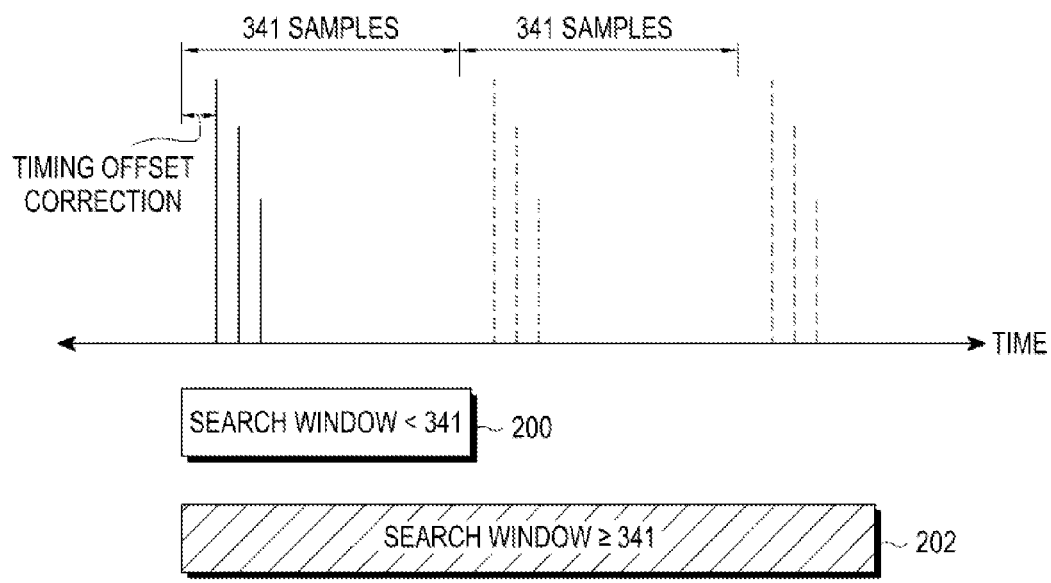
FIG. 2 illustrates a method for estimating a timing offset by Inverse Fast Fourier Transform (IFFT)-processing the frequency response of a preamble sequence according to the related art.
Figure 3:
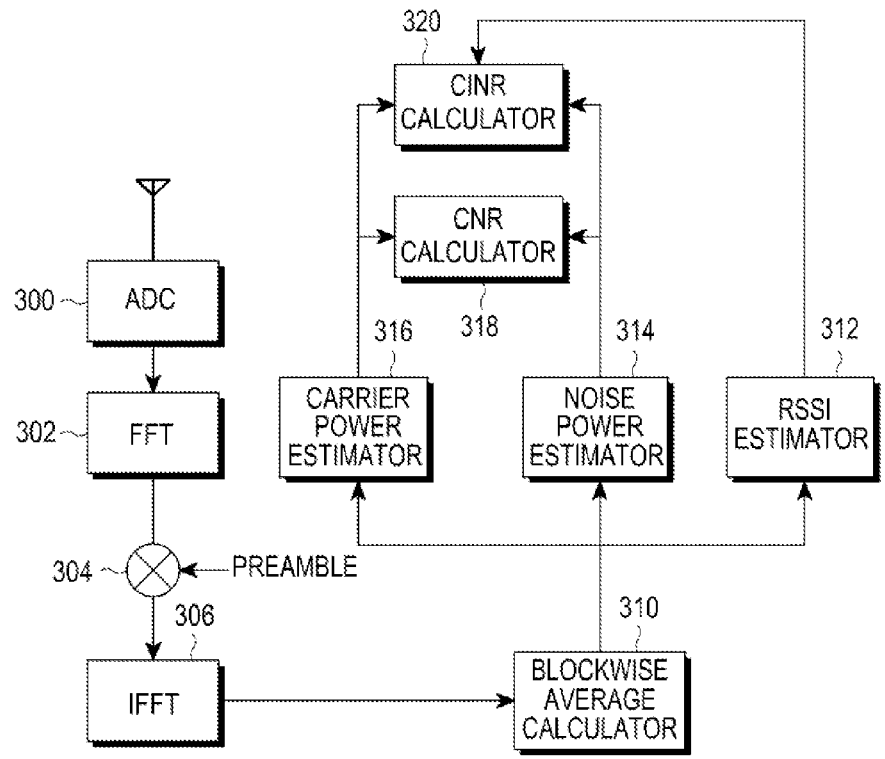
FIG. 3 is a block diagram of a Base Station (BS) apparatus for estimating the timing offset and Carrier-to-Noise Ratio/Carrier-to-Noise and Interference Ratio (CNR/CINR) of a block according to an exemplary embodiment of the present invention.

FIG. 3 is a block diagram of a BS apparatus for estimating the timing offset and CNR/CINR of a block according to an exemplary embodiment of the present invention.

In general, a BS transmits a preamble sequence in a first symbol of a downlink signal. A BS that intends to estimate a CNR/CINR receives a downlink signal carrying a preamble in a first symbol from another BS.

Referring to FIG. 3, an Analog-to-Digital Converter (ADC) 300 converts the received signal to a digital signal. A Fast Fourier Transform (FFT) processor 302 processes the digital signal to tone signals in the frequency domain. A multiplier 304 converts the frequency signal to a frequency response of a preamble sequence.

An Inverse Fast Fourier Transform (IFFT) processor 306 IFFT-processes the frequency response signal of the preamble sequence. The IFFT signal has a size expressed as the number of samples. For instance, the IFFT signal has as many samples as an FFT size (e.g. 1024). The same signal components are repeated N times with a period equal to an N/1 of the FFT size. To support various service environments, a search window size for estimating the timing offset of a received signal is preferably extended to the FFT size, not within an N/1 of the FFT size.

The degradation of each signal component differs during each repetition period within the FFT size due to channel interference or noise. Accordingly, the search window of the FFT size is divided into n blocks. Instant timing offsets, carrier power values, Received Signal Strength Indicator (RSSI) power values, and noise power values of the blocks are determined using instant power values insR×P of a preamble signal (after IFFT) received in each frame and stored on a block basis. The averages of these values are used in estimating a CNR according to an exemplary embodiment of the present invention. Herein, a frame is a signal unit of an FFT size equaling the size of a search window. The number of blocks n is obtained by dividing the FFT size by the size of each block.

A blockwise average calculator 310 calculates the average of instant received power values, a maximum block index, and a maximum preamble index and provides the calculated values to a carrier power estimator 316, a noise power estimator 314, and an RSSI power estimator 312. The carrier power estimator 316 and the noise power estimator 314 estimate a carrier power value and a noise power value using the received values, respectively, and provide the estimated carrier value and the estimated noise power value to a CNR calculator 318 and a CINR calculator 320. The RSSI power estimator 312 estimates an RSSI power value based on the values received from the blockwise average calculator 310 and provides the estimated RSSI power value to the CINR calculator 320.

It is to be clearly understood that the block diagram of FIG. 3 is purely exemplary and thus should not be construed as limiting the present invention. Especially, each of the ADC 300, the FFT processor 302, the multiplier 304, or the IFFT processor 306 is an exemplary component for performing a specific operation in a receiver (not shown) of the BS. The receiver is neither necessarily implemented with all of the components nor with specific individual devices or components. Likewise, any of the blockwise average calculator 310, the carrier power estimator 316, the noise power estimator 314, the RSSI estimator 312, the CNR calculator 318, or CINR calculator 320, in an exemplary embodiment, may be implemented by a CNR estimator (not shown) of a BS. It does not mean that all of such operations should be performed or that they should be performed by specific individual devices or components.

Figure 4:
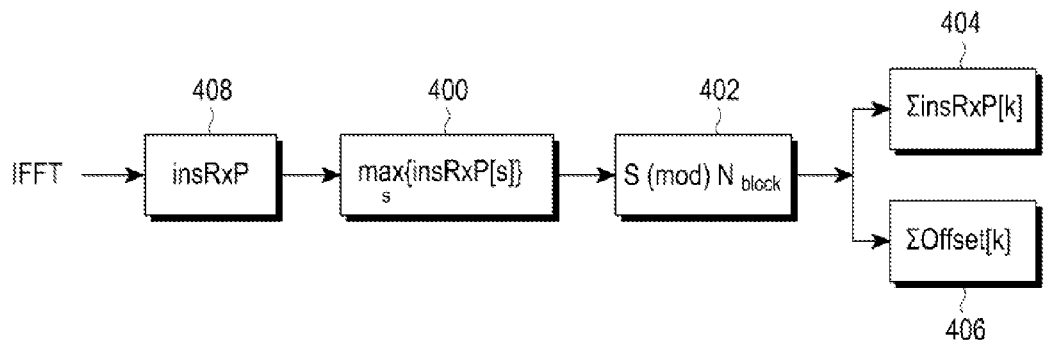
FIG. 4 is a block diagram of a blockwise average calculator according to an exemplary embodiment of the present invention.

FIG. 4 is a block diagram of a blockwise average calculator according to an exemplary embodiment of the present invention.

Referring to FIG. 4, an instantaneous power calculator 408 of the blockwise average calculator accumulates the instant received power values of a preamble signal received in a predetermined number of frames for each blocks. A first calculator 400 calculates a blockwise average received power value based on the accumulated instant received power values. The first calculator 400 determines the average of timing offsets corresponding to a block having a maximum average received power value as the timing offset of the preamble signal.

In other words, the first calculator 400 estimates a sample value s having a maximum power value in an IFFT signal to be the timing offset of the preamble signal.

Alternatively or additionally, a sample value based on an earliest threshold may be used, instead of a sample value having a maximum power value. That is, the first sample value having a power value exceeding an earliest threshold with respect to a maximum power value is determined to be an earliest path sync value s for use in calculating the average power of each block. The earliest threshold is lower than the maximum power value by a predetermined rate. As a power approximate to the maximum power value within a reliable range is considered to be the maximum power, the estimation can be performed rapidly. The earliest path sync refers to the first sample value having a larger power value than the earliest threshold, which is used as a start FFT position in estimating carrier power, RSSI power, and noise power.

A second calculator 402 matches a block k according to the estimated timing offset or the estimated earliest path sync value s. k denotes the index of the block having the earliest path sync value s, calculated by $k=s(\bmod)N_{block}$. A third calculator 406 calculates the frequency of the block k having the earliest path sync value s (i.e., the number of cases where the block has the earliest path sync value s) and the earliest path sync value of the block in each frame. A fourth calculator 404 calculates the instant received power value of the block k in each frame.

Figure 5:
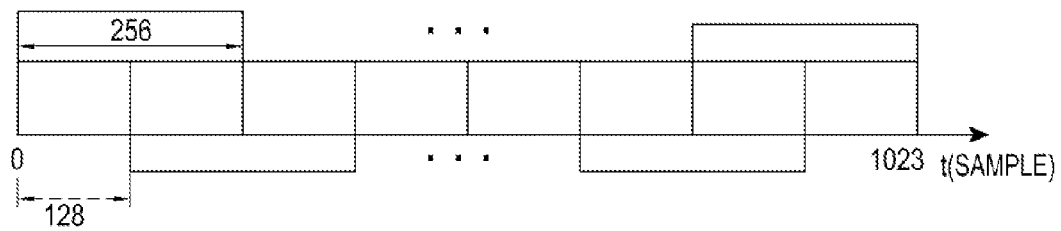
FIG. 5 illustrates a block structure for describing a timing offset for a Fast Fourier Transform (FFT) size of 1024 and a block size of 128 according to an exemplary embodiment of the present invention.

FIG. 5 illustrates a block structure for describing a timing offset for an FFT size of 1024 and a block size of 128 according to an exemplary embodiment of the present invention.

Referring to FIG. 5, blocks are chained to one another to prevent carrier power distribution caused by blocking.

The index of a block having a maximum average carrier power for each preamble index is a block index for the preamble index. The index of a block having a maximum average carrier power in initial $n_1$ frames may be computed by $$P_{Max}index_{PI} = \underset{i}{\mathrm{argmax}}\left(\frac{insRxP_{PI}[i] + insRxP_{PI}[i+1]}{NumBlock_{PI}[i] + NumBlock_{PI}[i+1]}\right), \quad (3)$$

$$i = 0, \ldots, N_{FFT}/L - 1$$

where $insRxP_{PI[i]}$ denotes the sum of received signals each having a maximum instant received power value in an $i^{th}$ block in each frame of a preamble index, $NumBlockp_{PI[i]}$ denotes the number of cases where the $i^{th}$ block has the maximum instant received power value, $N_{FFT}$ denotes the FFT size, and L denotes the size of each block.

Figure 6:
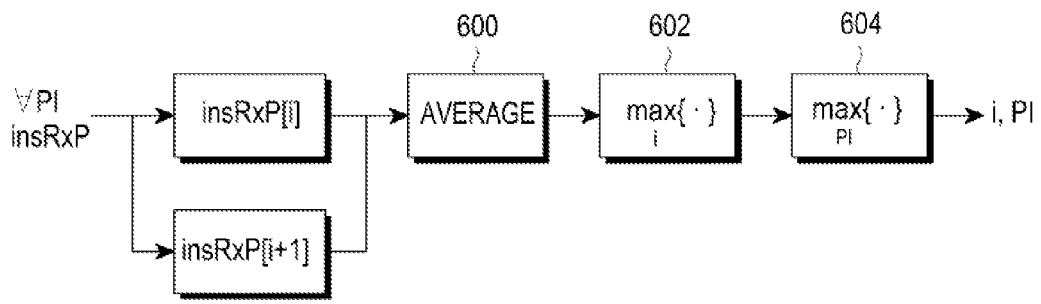
FIG. 6 is a block diagram of a configuration for locating a block having a maximum instant received power in a blockwise average calculator according to an exemplary embodiment of the present invention.

FIG. 6 is a block diagram of a configuration for locating a block having a maximum instant received power in a blockwise average calculator according to an exemplary embodiment of the present invention.

Referring to FIG. 6, a first calculator 600 receives the instant received power values insRxP[i] and insRx[i+1] of two adjacent blocks i and i+1 for each preamble index from the fourth calculator 404 and calculates the average of the instant received power values insRxP[i] and insRx[i+1]. A second calculator 602 calculates the index i of a block having a highest average instant received power value for each preamble index. A third calculator 604 calculates a preamble index PI corresponding to a preamble having the maximum of the highest average instant received power values of blocks.

The index (i in FIG. 6) of a block having a maximum average power for each preamble index is denoted by MaxIndex and the index (PI in FIG. 6) of a preamble having a block having the highest maximum average power value is denoted by MaxPI. MaxIndex may be expressed as $$MaxIndex = \underset{PI}{\mathrm{argmax}}\left(\underset{i}{\max}\left(\frac{insRxP_{PI}[i] + insRxP_{PI}[i+1]}{NumBlock_{PI}[i] + NumBlock_{PI}[i+1]}\right)\right) \quad (4)$$

The blockwise average calculator 314 accumulates noise power values and RSSI values for MaxPI for $n_2$ frames and provides the accumulated noise power and RSSI values to the noise power estimator 314 and the RSSI estimator 312. Instant received power values and timing offsets $insRxP_{PI}$ and $Offset_{PI}$ are also accumulated continuously for MaxPI. Optionally, $Offset_{PI}$ is a sample value having a maximum power or an earliest path sync value (i.e. sample value) for the preamble index.

Figure 7:
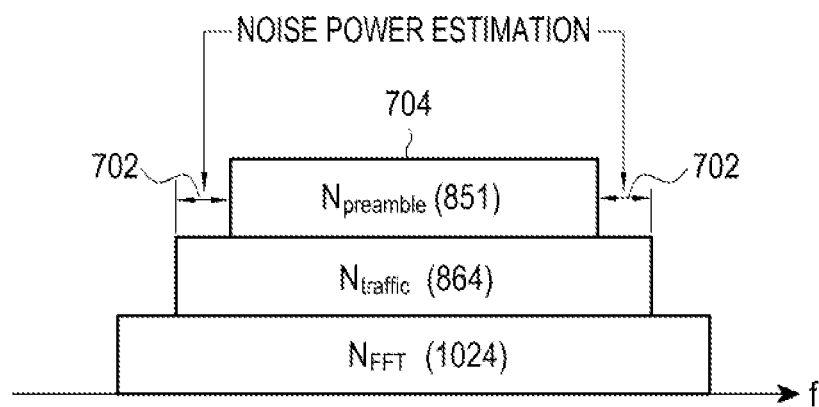
FIG. 7 illustrates noise power estimation for an FFT size of 1024 and a 10-MHz bandwidth according to an exemplary embodiment of the present invention.

FIG. 7 illustrates noise power estimation for an FFT size of 1024 and a 10-MHz bandwidth according to an exemplary embodiment of the present invention.

Referring to FIG. 7, the noise power of a period 702 that does not carry a preamble signal in a received signal with MaxPI is estimated. That is, after FFT, a receiver calculates noise power NP by accumulating the average of tone powers of the period 702 for blocks corresponding to the earliest path sync.

Figure 8:
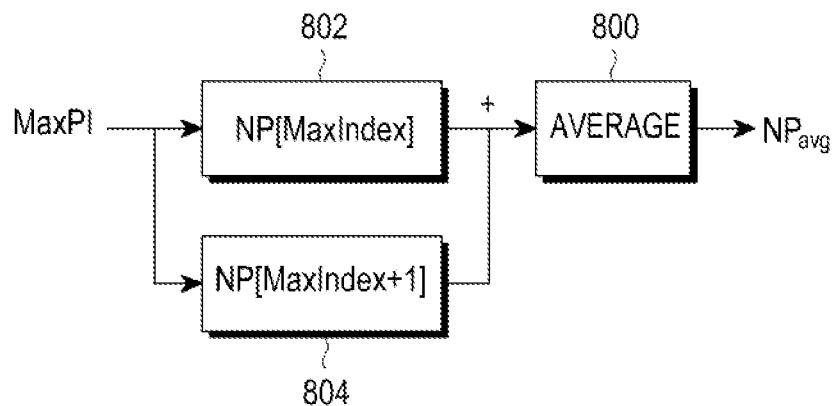
FIG. 8 is a block diagram of a noise power estimator according to an exemplary embodiment of the present invention.

FIG. 8 is a block diagram of a noise power estimator according to an exemplary embodiment of the present invention.

Referring to FIG. 8, first and second calculators 802 and 804 calculate the noise power values NP of blocks MaxIndex and MaxIndex+1 using a block index MaxIndex calculated based on an instant received signal power value $insRxP_{PI}$ accumulated for $(n_1+n_2)$ frames. A third calculator 800 calculates the average of the noise power values $NP_{avg}$ as an estimated noise power value, as given by $$NP_{avg} = \frac{NP[MaxIndex] + NP[MaxIndex+1]}{NumBlock[MaxIndex] + NumBlock[MaxIndex+1]} \quad (5)$$

Figure 9:
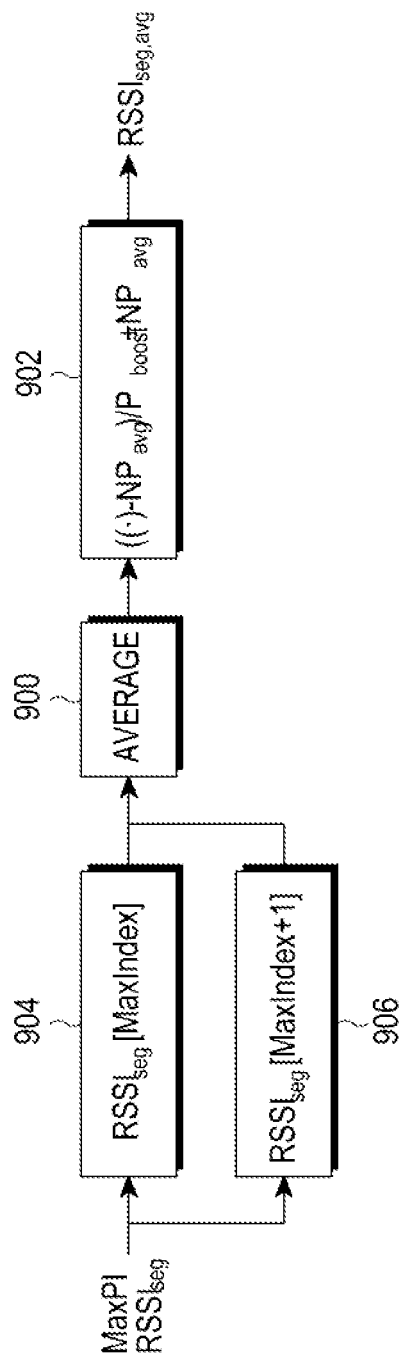
FIG. 9 illustrates a Received Signal Strength Indicator (RSSI) estimation operation of an RSSI estimator according to an exemplary embodiment of the present invention.

FIG. 9 illustrates an RSSI estimation operation of an RSSI estimator according to an exemplary embodiment of the present invention.

Referring to FIG. 9, the estimated average value of RSSIs for a preamble index MaxPI in each segment can be calculated by accumulating the average of tone power values of a signal carrying period 704, illustrated in FIG. 7, on a block basis.

Let the blockwise accumulated value of the average of tone power values of the signal carrying period 704 be denoted by $RSSI_{seg}$. Then, first and second calculators 904 and 906 calculate the RSSI values of blocks MaxIndex and MaxIndex+1 using a block index MaxIndex obtained by an instant received power value $insRxP_{PI}$ accumulated for $(n_1+n_2)$ frames. A third calculator 900 calculates the average of the RSSI values. A fourth calculator 902 calculates the estimated average RSSI value $RSSI_{seg,avg}$ of each segment through as much readjustment as a boosted signal amplitude.

$$RSSI_{seg,avg} = \frac{\left(\frac{RSSI_{seg}[MaxIndex] + RSSI_{seg}[MaxIndex+1]}{NumBlock[MaxIndex] + NumBlock[MaxIndex+1]} - NP_{avg}\right)}{P_{boost}} + NP_{avg} \quad (6)$$

Figure 10:
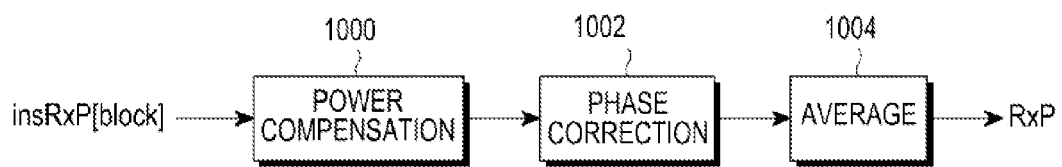
FIG. 10 illustrates a carrier power estimation operation of a carrier power estimator according to an exemplary embodiment of the present invention.

FIG. 10 illustrates a carrier power estimation operation of a carrier power estimator according to an exemplary embodiment of the present invention.

Referring to FIG. 10, a carrier power is estimated using the average of accumulated carrier power values and the average of accumulated earliest path sync values. A calculator 1000 compensates for power loss caused by the difference between the estimated timing offsets of blocks, a second calculator 1002 corrects a phase shift, and a third calculator 1004 calculates the average of the power-compensated, phase-corrected values. The carrier power estimation may be expressed as $$RxP_{PI} = \frac{\sum_{i=0}^{N_{FFT}/L-1} \frac{insRxP_{PI}[i]}{\left(\frac{N_{FFT} - X\left(\frac{Offset_{PI}[i]}{NumBlock_{PI}[i]} - n_{earl,PI}\right)}{N_{FFT}}\right)^2} \cos\left(\frac{6\pi\left(\frac{Offset_{PI}[i]}{NumBlock_{PI}[i]} - n_{earl,PI}\right)}{N_{FFT}}\right)}{P_{boost} \cdot \sum_{i=0}^{N_{FFT}/L-1} NumBlock_{PI}[i]} \quad (7)$$

where $n_{earl,PI}$ is $$n_{earl,PI} = \frac{Offset_{PI}[P_{Max}index_{PI}] + Offset_{PI}[P_{Max}index_{PI}+1]}{NumBlock_{PI}[P_{Max}index_{PI}] + NumBlock_{PI}[P_{Max}index_{PI}+1]} \quad (8)$$

In equation (8), i, the cos( ) function, and the X( ) function satisfy $$\left\{ i \mid NumBlock_{PI}[i] \neq 0, \left| \cos\left( \frac{6\pi \left( \frac{Offset_{PI}[i]}{NumBlock_{PI}[i]} - n_{earl,PI} \right)}{N_{FFT}} \right) \right| \geq 0.1 \right\}$$

and $$X(n) = \begin{cases} n, & n \geq 0 \\ 0, & 0 > n \geq -128 \\ -(n+128), & \text{otherwise.} \end{cases}$$

$P_{boost}$ denotes a boosting power, $RxP_{PI}$ denotes an estimated carrier power, $n_{earl,PI}$ denotes an estimated earliest path sync, and $Offset_{PI}[i]$ denotes the sum of earliest path sync values of $i^{th}$ blocks for a given preamble index.

Figure 11:
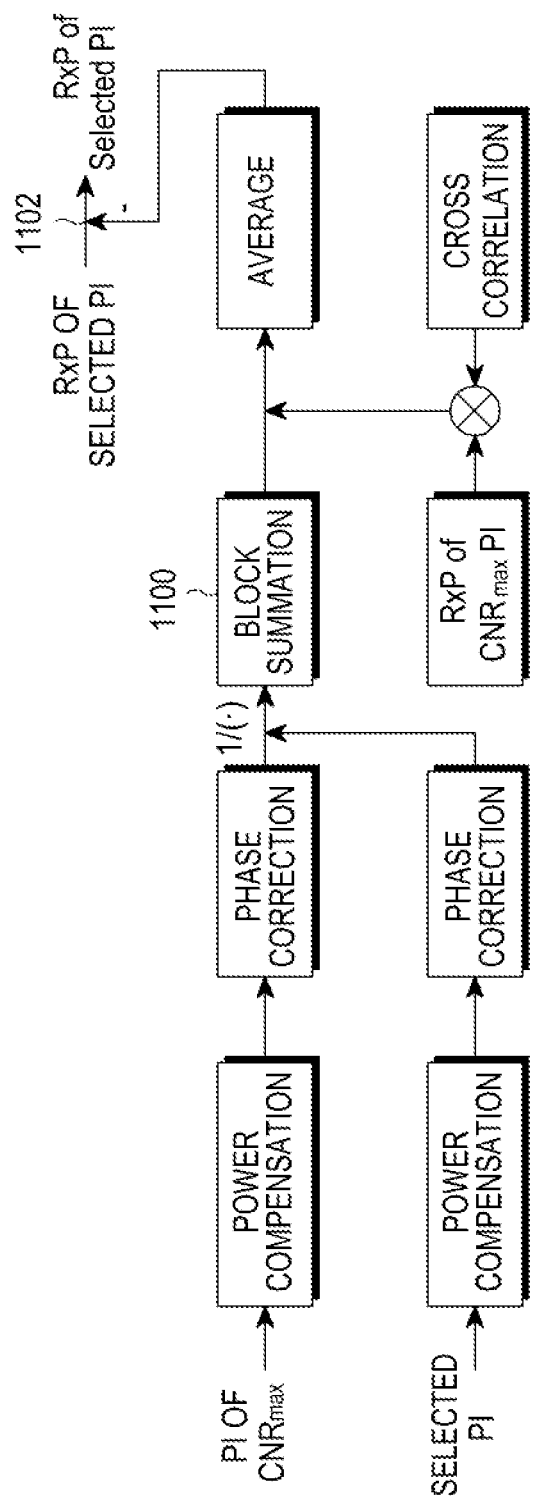
FIG. 11 illustrates an operation for cancelling interference caused by using a segment in a carrier power estimator according to an exemplary embodiment of the present invention.

FIG. 11 illustrates an operation for cancelling interference caused by using the same segment in a carrier power estimator according to an exemplary embodiment of the present invention.

Referring to FIG. 11, cross correlation interference occurs between the carrier power of each preamble index and the carrier power of another preamble signal using the same segment. Therefore, an estimated carrier power should be calculated by cancelling interference with another preamble.

Carrier power is compensated for every preamble index by sequentially selecting preamble indexes having estimated CNRs equal to or larger than $Th_{cross}$.

Because only preamble signals having CNRs equaling or exceeding a specific value causes mutual interference affecting carrier power estimation, a threshold CNR $Th_{cross}$ is set to take into account such preamble signals. A mutual interference-cancelled estimated carrier power $RxP_{PI}'$ is computed by $$RxP_{PI}' = \qquad (9)$$

$$RxP_{PI} - \frac{\left\{ RxP_{CNR_{Max}index} \cdot Cross_{PI,CNR_{Max}} \cdot \sum_{i=0}^{N_{FFT}/L-1} \left( \frac{NumBlock_{PI}[i] \cdot \left( \left( N_{FFT} - X\left( \frac{Offset_{PI}[i]}{NumBlock_{PI}[i]} - n_{earl,CNR_{Max}index} \right) \right)^2 \cdot \cos\left( \frac{6\pi \left( \frac{Offset_{PI}[i]}{NumBlock_{PI}[i]} - n_{earl,CNR_{Max}index} \right)}{N_{FFT}} \right) \right)}{ \left( N_{FFT} - X\left( \frac{Offset_{PI}[i]}{NumBlock_{PI}[i]} - n_{earl,PI} \right) \right)^2 \cdot \cos\left( \frac{6\pi \left( \frac{Offset_{PI}[i]}{NumBlock_{PI}[i]} - n_{earl,PI} \right)}{N_{FFT}} \right)} \right) \right\}}{\sum_{i=0}^{N_{FFT}/L-1} NumBlock_{PI}[i]}$$

where $Cross_{PI,CNRMax}$ denotes a correlation with a preamble signal having a maximum CNR for a selected preamble index.

An interference component of an overlapped part between preamble signals using the same segment during FFT is calculated between a preamble index having a maximum CNR and a selected one of preamble indexes having estimated CNRs equaling or exceeding the threshold $Th_{cross}$ (1100). The interference component of the preamble signal having the maximum CNR is eliminated according to the cross correlation between the two preamble indexes, that is, the selected preamble index and the preamble index with the maximum CNR (1102).

An estimated CNR can be calculated using the interference-cancelled carrier power of equation (1).

Figure 12:
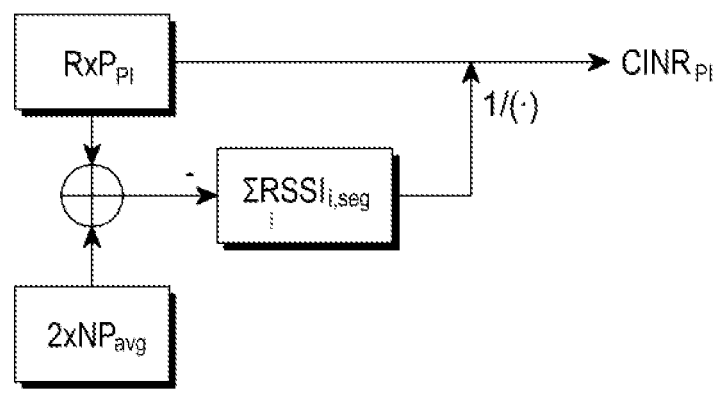
FIG. 12 illustrates an operation of a CINR calculator according to an exemplary embodiment of the present invention.

FIG. 12 illustrates an operation of a CINR calculator according to an exemplary embodiment of the present invention.

A CINR can be computed by $$CINR_{PI} = \frac{RxP_{PI}}{RSSI_{0,avg} + RSSI_{1,avg} + RSSI_{2,avg} - 2NP_{avg} - RxP_{PI}} \qquad (10)$$

FIGS. 13A to 13D are graphs illustrating performance in a CNR estimation method according to exemplary embodiments of the present invention, when $N_{FFT}$ is 1024, $N_{block}$ is 128, n1 and n2 are both 1024, $Th_{cross}$ is −8 dB, and an earliest threshold is −3 dB with respect to a maximum power value.

Figure 13A:
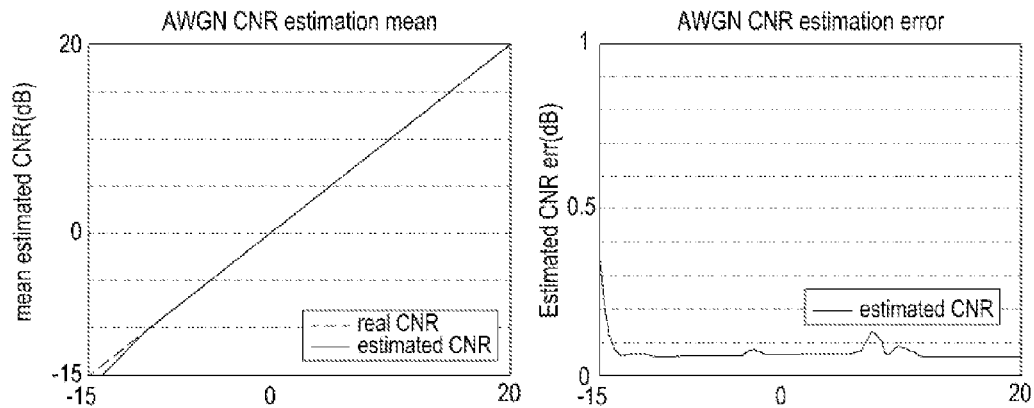
FIG. 13A is a graph illustrating Additive White Gaussian Noise (AWGN) CNR estimation mean values and AWGN CNR estimation errors of an International Telecommunication Union-Radio communications (ITU-R) channel model in a CNR estimation method according to an exemplary embodiment of the present invention.

FIG. 13A is a graph illustrating Additive White Gaussian Noise (AWGN) CNR estimation mean values and AWGN CNR estimation errors of an International Telecommunication Union-Radio communications (ITU-R) channel model in a CNR estimation method according to an exemplary embodiment of the present invention.

Figure 13B:
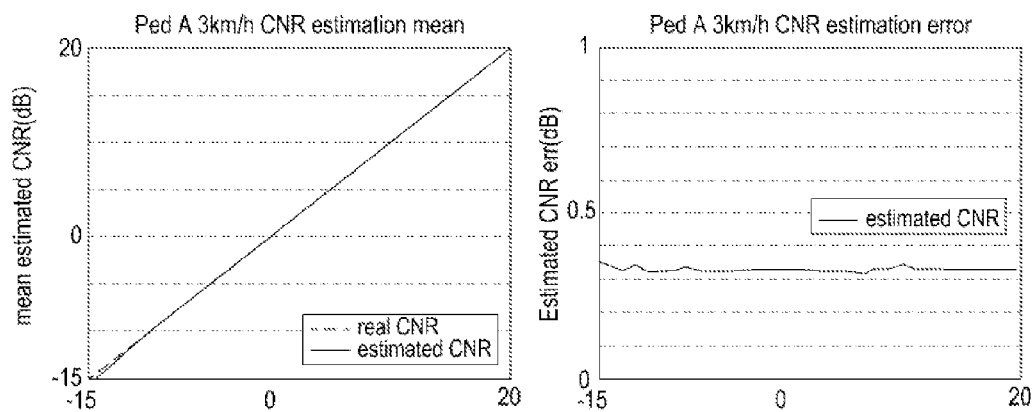
FIG. 13B is a graph illustrating Ped A 3 km/h CNR estimation mean values and Ped A 3 km/h estimation errors in a CNR estimation method according to an exemplary embodiment of the present invention.

FIG. 13B is a graph illustrating Ped (Pedestrian) A 3 km/h CNR estimation mean values and Ped A 3 km/h estimation errors in a CNR estimation method according to an exemplary embodiment of the present invention.

Figure 13C:
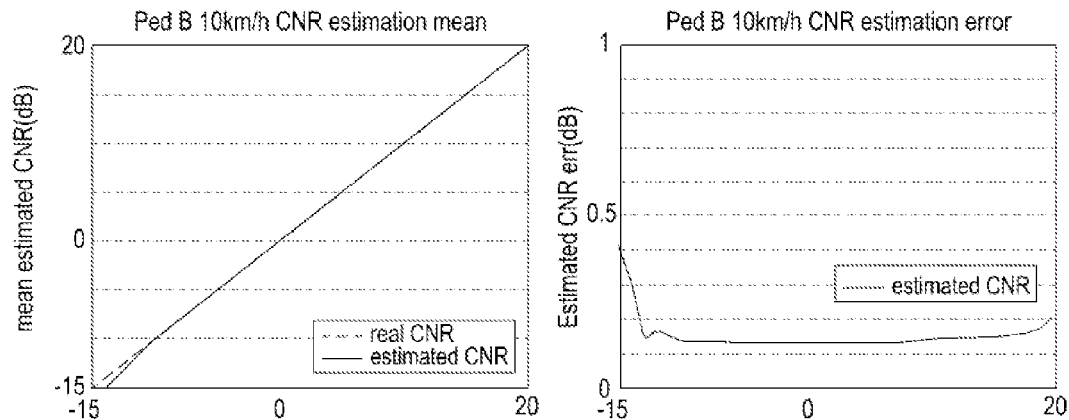
FIG. 13C is a graph illustrating Ped B 10 km/h CNR estimation mean values and Ped B 10 km/h estimation errors in a CNR estimation method according to an exemplary embodiment of the present invention.

FIG. 13C is a graph illustrating Ped B 10 km/h CNR estimation mean values and Ped B 10 km/h estimation errors in a CNR estimation method according to an exemplary embodiment of the present invention.

Figure 13D:
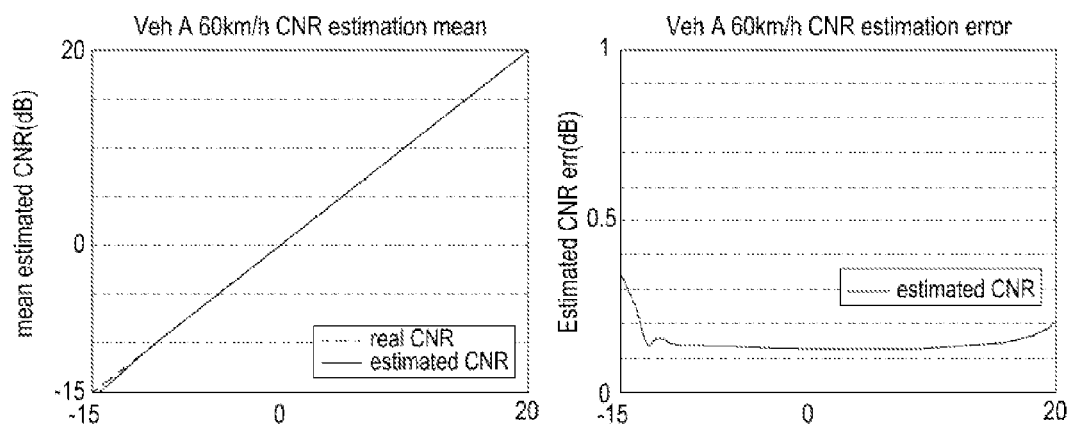
FIG. 13D is a graph illustrating Veh 60 km/h CNR estimation mean values and Veh 60 km/h estimation errors in a CNR estimation method according to an exemplary embodiment of the present invention.

FIG. 13D is a graph illustrating Veh 60 km/h CNR estimation mean values and Veh 60 km/h estimation errors in a CNR estimation method according to an exemplary embodiment of the present invention.

As noted from FIGS. 13A to 13D, an estimated CNR error is within 1 dB at −15 dB to 20 dB.

More specifically, the estimation error between an actual CNR and an estimated CNR is about 0.1 dB, except for the case of Ped B 3 km/h (about 0.3 dB, which is a reliable error level) illustrated in FIG. 13B. Thus, the CNR estimation method according to exemplary embodiments of the present invention has a reliable estimation performance. That is, information about an adjacent wireless environment can be estimated reliably under an environment where the coverage of a BS is extended using the SON technology. As a consequence, the self-configurable function can be effectively performed.

As is apparent from the above description of exemplary embodiments of the present invention, a transmission signal having a long arrival time due to service coverage extension can be received reliably. Therefore, information about an adjacent wireless environment can be estimated accurately using a CNR/CINR in a wireless access system to which a variety of SON functions are applied. The resulting effective self-configuration function increases overall system performance through optimization of operation parameters.

The above-described operation may be implemented as code that can be written to a computer-readable recording medium and can thus be read by a processor. The computer-readable recording medium may be any type of recording device in which data can be stored in a computer-readable manner. Examples of the computer-readable recording medium include a ROM, a RAM, a CD-ROM, a magnetic tape, a floppy disc, an optical data storage, and a carrier wave (e.g., data transmission through the Internet). The computer-readable recording medium can be distributed over a plurality of computer systems connected to a network so that computer-readable code is written thereto and executed therefrom in a decentralized manner. Functional programs, code, and code segments needed for realizing the embodiments herein can be construed by one of ordinary skill in the art.

While the invention has been shown and described with reference to exemplary embodiments thereof, it will be understood by those skilled in the art that various changes in form and details may be made therein without departing from the spirit and scope of the invention as defined by the appended claims and their equivalents.

What is claimed is:

1. A method for estimating a Carrier-to-Noise Ratio (CNR) at a Base Station (BS) in a wireless access system, the method comprising:
    converting a preamble signal received from at least one neighbor BS to a frequency response of a preamble sequence and Inverse Fast Fourier Transform (IFFT)-processing the preamble signal;
    dividing an estimation period of the IFFT-processed preamble signal, corresponding to a Fast Fourier Transform (FFT) size, into a predetermined number of blocks;
    accumulating carrier power values during a predetermined number of frames for each of the blocks;
    calculating average carrier power values and determining an average of timing offsets of the frames corresponding to a position of a block having a maximum average carrier value as a timing offset of the preamble signal;
    calculating a carrier power value of the preamble signal using the timing offset; and
    estimating a CNR of the preamble signal using the carrier power value.

2. The method according to claim 1, wherein the determining of the average of the timing offset comprises determining an average of timing offsets corresponding to blocks each having an earliest sample with a carrier power value larger than a predetermined earliest threshold among samples of the estimation period to be the timing offset of the preamble signal.

3. The method according to claim 2, further comprising: determining a maximum preamble index by comparing averages of carrier power values of adjacent blocks among blocks of the estimation period.

4. The method according to claim 1, further comprising: determining an estimated carrier power value, Received Signal Strength Indicator (RSSI) power value, and noise power value of the block having the maximum average of accumulated carrier values to be an estimated carrier power value, RSSI power value, and noise power value of the preamble signal.

5. The method according to claim 2, wherein the calculating of the carrier power value comprises compensating for power loss caused by a change in a timing offset estimated on a block basis and correcting a phase shift, for the carrier power value.

6. The method according to claim 5, wherein the calculating of the carrier power value further comprises canceling interference on a cross correlation with another preamble signal using the same segment representing the same subcarrier allocation as the preamble signal.

7. The method according to claim 1, further comprising:
calculating a Carrier-to-Interference and Noise Ratio (CINR) of the preamble signal using the carrier power value using the following equation:

$$CINR_{PI} = \frac{RxP_{PI}}{RSSI_{0,avg} + RSSI_{1,avg} + RSSI_{2,avg} - 2NP_{avg} - RxP_{PI}}$$

where RxPPI denotes the carrier power value, NPavg denotes an average noise power value of the preamble signal, and RSSIi,avg denotes an average RSSI of segment i representing subcarrier allocation of the preamble signal.

8. The method according to claim 6, further comprising:
calculating a Carrier-to-Interference and Noise Ratio (CINR) of the preamble signal using the carrier power value using the following equation:

$$CINR_{PI} = \frac{RxP_{PI}}{RSSI_{0,avg} + RSSI_{1,avg} + RSSI_{2,avg} - 2NP_{avg} - RxP_{PI}}$$

where RxPPI denotes the carrier power value, NPavg denotes an average noise power value of the preamble signal, and RSSIi,avg denotes an average RSSI of segment i representing subcarrier allocation of the preamble signal.

9. A Base Station (BS) apparatus for estimating a Carrier-to-Noise Ratio (CNR) in a wireless access system, the apparatus comprising:
    a receiver for converting a preamble signal received from at least one neighbor BS to a frequency response of a preamble sequence and for Inverse Fast Fourier Transform (IFFT)-processing the preamble signal; and
    a CNR estimator for dividing an estimation period of the IFFT-processed preamble signal, corresponding to a Fast Fourier Transform (FFT) size, into a predetermined number of blocks, for accumulating carrier power values during a predetermined number of frames for each of the blocks, for calculating average carrier power values and determining an average of timing offsets of the frames corresponding to a position of a block having a maximum average carrier value as a timing offset of the preamble signal, for calculating a carrier power value of the preamble signal using the timing offset, and for estimating a CNR of the preamble signal using the carrier power value.

10. The BS apparatus according to claim 9, wherein the CNR estimator determines an average of timing offsets corresponding to blocks each having an earliest sample with a carrier power value larger than a predetermined earliest threshold among samples of the estimation period to be the timing offset of the preamble signal.

11. The BS apparatus according to claim 10, wherein the CNR estimator determines a maximum preamble index by comparing averages of carrier power values of adjacent blocks among blocks of the estimation period.

12. The BS apparatus according to claim 9, wherein the CNR estimator determines an estimated carrier power value, a Received Signal Strength Indicator (RSSI) power value, and a noise power value of the block having the maximum average of accumulated carrier values to be an estimated carrier power value, RSSI power value, and noise power value of the preamble signal.

13. The BS apparatus according to claim 10, wherein the CNR estimator calculates the carrier power value by compensating for power loss caused by a change in a timing offset estimated on a block basis and correcting a phase shift, for the carrier power value.

14. The BS apparatus according to claim 13, wherein the CNR estimator calculates the carrier power value by cancelling interference on a cross correlation with another preamble signal using the same segment representing the same subcarrier allocation as the preamble signal.

15. The BS apparatus according to claim 9, wherein the CNR estimator calculates a Carrier-to-Interference and Noise Ratio (CINR) of the preamble signal using the carrier power value using the following equation:

$$CINR_{PI} = \frac{RxP_{PI}}{RSSI_{0,avg} + RSSI_{1,avg} + RSSI_{2,avg} - 2NP_{avg} - RxP_{PI}}$$

where $RxP_{PI}$ denotes the carrier power value, $NP_{avg}$ denotes an average noise power value of the preamble signal, and $RSSI_{i,avg}$ denotes an average RSSI of segment i representing subcarrier allocation of the preamble signal.

16. The BS apparatus according to claim 14, wherein the CNR estimator calculates a Carrier-to-Interference and Noise Ratio (CINR) of the preamble signal using the carrier power value using the following equation:

$$CINR_{PI} = \frac{RxP_{PI}}{RSSI_{0,avg} + RSSI_{1,avg} + RSSI_{2,avg} - 2NP_{avg} - RxP_{PI}}$$

where $RxP_{PI}$ denotes the carrier power value, $NP_{avg}$ denotes an average noise power value of the preamble signal, and $RSSI_{i,avg}$ denotes an average RSSI of segment i representing subcarrier allocation of the preamble signal.

\* \* \* \* \*